United States Patent [19]

Duffer et al.

[11] Patent Number: 4,529,648
[45] Date of Patent: Jul. 16, 1985

[54] METHOD OF APPLYING INTERLEAVING MATERIAL TO GLASS SHEETS

[75] Inventors: Paul F. Duffer, Creighton; Joseph D. Kelly, Cheswick; Helmut Franz, Pittsburgh, all of Pa.

[73] Assignee: PPG Industries, Inc., Pittsburgh, Pa.

[21] Appl. No.: 229,220

[22] Filed: Jan. 28, 1981

[51] Int. Cl.³ .............. B32B 15/00; B32B 17/08; B32B 23/00
[52] U.S. Cl. ........................ 428/326; 65/24; 252/11; 428/432; 428/438; 427/384
[58] Field of Search ......... 65/24; 252/11, 384; 427/154, 189, 384; 428/426, 326, 432, 438

[56] References Cited

U.S. PATENT DOCUMENTS

| | | | |
|---|---|---|---|
| 3,723,321 | 3/1973 | Hay, Jr. ................. | 252/11 |
| 4,011,359 | 3/1977 | Simpkin et al. .......... | 428/326 |
| 4,200,670 | 4/1980 | Albach ................. | 427/154 |
| 4,263,371 | 4/1981 | Franz ................... | 427/384 X |

*Primary Examiner*—Michael R. Lusignan
*Attorney, Agent, or Firm*—Donna L. Seidel

[57] ABSTRACT

A method is disclosed for applying a powdered interleaving material to a glass surface in the form of an aqueous slurry.

16 Claims, No Drawings

METHOD OF APPLYING INTERLEAVING MATERIAL TO GLASS SHEETS

BACKGROUND

The present invention relates generally to the art of separating glass sheets and relates more particularly to the art of applying powdered interleaving materials.

It is well-known in the art that stacked glass sheets may be protected from surface damage by the use of various interleaving material such as paper or powdered materials such as wood flour, polyethylene, polystyrene or polyacrylates. Powdered materials are preferably finely divided, fairly uniform in size distribution, and free-flowing so that they may be applied by means of conventional, commercially available equipment.

U.S. Pat. No. 3,723,312 to Hay discloses using a dedusted agglomerated salicylic acid, mixed with an inert separator material such as polystyrene beads. This particulate interleaving material may be applied to glass by mechanical dusters or other particulate application equipment known to those skilled in the art of dusting glass with wood flour or other inert particulate interleaving materials.

U.S. Pat. No. 4,200,670 to Albach describes a method of treating glass sheets to be stacked by applying water, a stain inhibiting material such as ammonium chloride, and dry particles of a mechanical separator such as wood flour, to such sheets in a plurality of sequential steps. According to one specific embodiment, the water and stain inhibitor are first applied to the glass as an aqueous solution of the latter to provide a wet layer on the sheet surface, and then separately applying a dry particulate layer of a mechanical separator is specifically applied to the wet layer. The method can also be carried out by first spraying the glass surface with water alone, and then separately applying or layers of a stain inhibitor and a mechanical separator in dry powdered form to the layer of water; or by first applying a layer of a mixture of dry powdered stain inhibitor and mechanical separator and then spraying this layer of dry material with water.

SUMMARY OF THE INVENTION

The present invention involves the application of powdered interleaving material to a glass surface in the form of an aqueous slurry. In accordance with the present invention, powdered interleaving materials, particularly wood flour, is combined with water to form an aqueous slurry which is applied to the glass surface. Upon drying, a uniform distribution of interleaving material is obtained on the glass surface. Although the slurry-applied powdered interleaving is sufficiently adherent to the glass to withstand handling and transporting, it is easily removed by washing prior to further processing operations such as coating or laminating, with no adverse effects on such subsequent processing operations.

DESCRIPTION OF THE PREFERRED EMBODIMENTS

Glass sheets are treated with an aqueous slurry of a powdered interleaving material in accordance with the present invention. The powdered interleaving material may be any finely divided support material such as vermiculite, polyethylene, polystyrene, polymethylmethacrylate, etc., but is preferably a porous cellulose material such as wood flour or rice flour.

In a preferred embodiment of the present invention, a quantity of about 1 to 100 grams, preferably about 10 to 20, grams of wood flour is dispersed per liter of water. This aqueous slurry is applied to glass surfaces by any conventional technique, preferably by flooding or spraying. The slurry may be dried at elevated temperatures, but preferably is allowed to dry at ambient temperature. Upon drying, the glass surface is uniformly covered with the interleaving material. Adherence of the interleaving material is sufficient to withstand handling and transporting; however, the material may be easily removed by conventional washing operations prior to further processing steps such as coating or laminating.

In a most preferred embodiment of the present invention the interleaving material is impregnated with a strongly acidic organic compound as disclosed in U.S. Ser. No. 229,208 filed on even date herewith by the same inventors, entitled "Acidified Powdered Interleaving", the disclosure of which is incorporated herein by reference. In an alternate preferred embodiment of the present invention, the slurry comprises a porous support material such as wood flour dispersed in an aqueous solution of a strongly acidic organic compound. In these embodiments, the strongly acidic organic compound is characterized as being water soluble, solid at ambient temperatures, and having a pH less than about 3 when dissolved in water at a concentration of about 1 percent. Suitable organic acids include the strongly acidic organotin compounds, such as organotin halides, especially alkyltin halides such as methyltin trichloride, dimethyltin dichloride, trimethyltin chloride and mixtures thereof. Organic acids such as citric, malic or tartaric acid are preferred if the treated glass is to be tempered without washing, since these acids will completely burn off, leaving no residue on the surface of the tempered glass sheet.

The present invention will be further understood from the description of a specific examples which follow.

EXAMPLE I

An aqueous slurry is formed by dispersing 1 gram of wood flour per 100 milliliters of water which contains 1 percent by weight of a mixture of 80 percent by weight dimethyltin dichloride and 20 percent by weight methyltin trichloride. The slurry is applied to glass at ambient temperature and allowed to dry. The volume of slurry is such that the coverage rate is about 20,000 square feet of glass per pound of wood flour. A uniform distribution of interleaving material on the glass surface is obtained. Treated glass sheets are stacked and exposed to 140° F. (about 60° C.) at 100 percent relative humidity for accelerated staining tests. The glass surfaces are free of stain after more than 45 days of exposure to the test conditions. Moreover, the interleaving material is sufficiently adherent to remain on the glass throughout handling and transportation, but is easily removed by conventional washing techniques prior to subsequent processing such as coating or laminating.

EXAMPLE II

An aqueous slurry is formed by dispersing 1 gram of wood flour per 100 milliliters of water which contains 2 percent by weight boric acid. The slurry is applied to glass sheets at ambient temperatures, and dried to leave a uniform layer of interleaving material on the glass surfaces. Treated glass sheets are stacked and subjected to accelerated staining tests as in the previous example. The glass survived for 85 days without major stain damage.

EXAMPLE III

Glass treated with an aqueous slurry of wood flour in 1 percent citric acid withstood more than 34 days of accelerated test conditions without heavy staining.

EXAMPLE IV

Glass treated with an aqueous slurry of wood flour and 1 percent tartaric acid survived 34 days of accelerated testing in excellent conditions.

EXAMPLE V

Glass treated with an aqueous slurry of rice flour and 2 percent boric acid remained in excellent condition after 59 days of accelerated staining tests.

The above examples are offered to illustrate the present invention. Various modifications, such as the use of other powdered interleaving materials, with or without stain inhibiting materials, and various concentrations and application techniques, are included within the scope of the invention, which is defined by the following claims.

We claim:

1. In a method for applying a powdered interleaving material to a glass surface, the improvement which comprises:
   a. dispersing the powdered interleaving material in water to form an aqueous slurry;
   b. applying said aqueous slurry of said powdered interleaving material to a glass surface; and
   c. drying said aqueous slurry to obtain a uniform adherent layer of interleaving material on said glass surface.

2. The method according to claim 1, wherein said powdered interleaving material is wood flour.

3. The method according to claim 2, wherein said wood flour is dispersed in water at a concentration of about 1 to 100 grams per liter.

4. The method according to claim 1, wherein said aqueous slurry further comprises a stain inhibitor.

5. The method according to claim 4, wherein the stain inhibitor is a strongly acidic organic compound.

6. The method according to claim 5, wherein the stain inhibitor is an organotin compound.

7. The method according to claim 6, wherein the organotin compound is an alkyltin halide selected from the group consisting of methyltin trichloride, dimethyltin dichloride, trimethyltin chloride and mixtures thereof.

8. The method according to claim 7, wherein the aqueous slurry comprises about 0.1 to 5 percent of the alkyltin halide based on the weight of the water.

9. The method according to claim 8, wherein the alkyltin halide is a mixture comprising 80 percent by weight dimethyltin dichloride and 20 percent by weight methyltin trichloride.

10. The method according to claim 9, wherein the aqueous slurry comprises about 1 gram of wood flour per 100 milliliters of water.

11. An article of manufacture which comprises:
    a. a plurality of glass sheets stacked in facing relationship; and
    b. adhered to the interfacing surfaces of said glass sheets a uniform distribution of a powdered interleaving material applied by contacting said glass surfaces with an aqueous slurry of said powdered interleaving material which further comprises an organotin halide and thereafter drying.

12. The article according to claim 11, wherein the powdered interleaving material is wood flour.

13. The article according to claim 12, wherein the wood flour is applied at a coverage of in the range of 20,000 to 25,000 square feet of glass per pound of wood flour.

14. The article according to claim 11, wherein the aqueous slurry further comprises an alkyltin halide.

15. The article according to claim 14, wherein the alkyltin halide is an alkyltin chloride selected from the group consisting of trimethyltin chloride, dimethyltin dichloride, methyltin trichloride and mixtures thereof.

16. The article according to claim 15, wherein the alkyltin chloride comprises about 80 percent by weight dimethyltin dichloride and about 20 percent by weight methyltin trichloride.

* * * * *